United States Patent [19]

Herschel

[11] Patent Number: 4,488,364

[45] Date of Patent: Dec. 18, 1984

[54] MODULAR APPARATUS FOR LAUNDRY DRYER HEAT RECOVERY

[76] Inventor: Ben B. Herschel, 242-B Laurel Pl., Howell, N.J. 07731

[21] Appl. No.: 410,448

[22] Filed: Aug. 23, 1982

[51] Int. Cl.³ ............................................. F26B 11/04
[52] U.S. Cl. ......................................... 34/86; 34/133; 165/8; 165/9
[58] Field of Search ................... 34/86, 133; 165/7, 8, 165/9, 10

[56] References Cited

U.S. PATENT DOCUMENTS

| | | | |
|---|---|---|---|
| 3,996,997 | 12/1976 | Regan et al. | 165/8 |
| 4,270,282 | 6/1981 | Lotz | 34/133 |
| 4,337,819 | 7/1982 | Phillips | 165/9 |
| 4,360,977 | 11/1982 | Frohbieter | 34/133 |

Primary Examiner—Larry I. Schwartz

[57] ABSTRACT

A self-contained heat recovery system for residential and commercial laundry dryers combines the principles of regenerative heat recovery with utilization of the dryer's existing drive apparatus to accomplish operation of the heat recovery system. The invention includes a rotary regenerative heat exchanger designed to permit planar adjustment of its surface; peripheral and airstream isolation seals to prevent loss of heat exchanger thermal effectiveness; apparatus for transmitting rotational forces from the laundry dryer tumbler to the rotary heat exchanger; cabinetry to function as a means of attaching the heat recovery system to the laundry dryer, as well as to provide airflow plenum chambers adjacent to the rotary heat exchanger to utilize existing airflow capabilities of the laundry dryer; cabinetry to further serve as structural support for rotary heat exchanger and its associated power transmission components.

7 Claims, 4 Drawing Figures

MODULAR APPARATUS FOR LAUNDRY DRYER HEAT RECOVERY

BACKGROUND OF THE INVENTION

1. Field of the Invention

This invention relates to laundry dryers where ambient air moves past various types of heating apparatus, passes through a tumbler containing moisture-laden laundry, and accomplishes drying of the laundry by extracting the moisture therefrom. More particularly, the invention relates to the recovery of the heat contained within the air exhausted from the laundry dryer, enabling the otherwise wasted heat energy to be returned to the dryer's heating apparatus so that significant fuel savings are realized.

2. Description of the Prior Art

There have been numerous attempts to recycle exhausted hot air from laundry dryers to reduce overall energy consumption. The majority of these have employed stationary passive heat exchangers. See in particular, U.S. Pat. No. 4,063,590, entitled "Preheater for Clothes Dryer", issued to C. McConnell. A similar arrangement, utilizing a shell-and-tube type passive heat exchanger, instead of a folded plate type, is revealed in U.S. Pat. No. 3,859,735, issued to Katterjohn. There are two fundamental problems inherent in application of stationary exchangers to processes of this type. The first is that of lint accumulation within the heat exchanger baffles, causing an increase in heat exchanger airflow resistance and a corresponding decrease in thermal efficiency. Additionally, the requirement for extremely large amounts of heat transfer surface to provide meaningful thermal efficiency results in severe impact upon the cost of the system and its capability for offsetting equipment cost through fuel savings. In contrast, the regenerative capability of rotary heat exchange media as well as its inherent ability to provide large amounts of transfer surface in a limited space renders it most useful for applications such as laundry drying. Inherent also in laminar-flow media rotary heat exchangers is "self-cleaning" of the heat transfer surface afforded by the reversal of fluid flow as the exchanger rotates between counterflowing airstreams. These factors, combined with others which will become evident later in this disclosure, provide for operation of laundry dryers which is substantially more energy-efficient than has heretofore been the case.

The principles and usage of rotary heat exchangers are well documented. See, in particular, U.S. Pat. Nos. 2,579,912; 2,887,456; 3,290,764; 3,702,156; 4,093,435; 4,307,774. Such exchangers, commonly referred to as "heat recovery wheels", have traditionally been confined to high-volume, energy-intensive airflow situations, owing to the cost of the heat exchangers and associated installations. Recent increases in fuel costs relative to costs of other goods now make application of such exchangers economically feasible on systems which utilize smaller volumes.

A problem which has traditionally plagued rotary heat exchangers of the type disclosed in the prior art concerns effective sealing between the rotating exchanger and its adjacent stationary supporting structure. Inefficient sealing has resulted in loss of thermal effectiveness due to air bypassing the heat exchange media at the exchanger's periphery; additional problems have resulted from leakage at the divider between counterflowing fluid streams, often causing what is referred to as "cross-contamination" of the new, incoming fluid stream by the contaminated exhaust stream. This ineffective sealing is due to the difficulty associated with the economical manufacture of a large diameter circular matrix which remains planar upon rotation. The problem is enhanced when the heat exchanger is subjected to temperatures in excess of 300° F. ("industrial process" applications), in which the heat exchanger undergoes severe radial as well as planar distortion due to cyclical exposure of the heat exchange media to temperature gradients of the counterflowing airstreams. To overcome the leakage, various "floating" contact seals have been developed. See, in particular, U.S. Pat. No. 4,068,708, issued to Y. Sakaki. While this solves the leakage problem, its cost is prohibitive for lower-efficiency, less cost-effective exchangers used at "environmental" temperatures (as for heating and air-conditioning). The sealing/leakage problem reduces to that of manufacturing a "flat" (planar with respect to its rotating axis) heat exchanger or providing economical means of adjustment whereby the exchanger's "flatness", as well as concentricity, can be controlled. Means for achieving this adjustment are presented in detail in this disclosure.

In view of the foregoing information, it is obvious that the principles of rotary heat exchange are known in the art. The invention described herein utilizes known principles of said heat exchange, combining them with mechanical and structural improvements which markedly improve the fuel-efficiency of laundry dryers, as well as improving the thermal effectiveness and operation of the exchangers themselves.

SUMMARY OF THE INVENTION

Briefly, the invention is comprised of a rotary regenerative air-to-air heat exchanger; a partitioned box to serve as a set of plenum chambers for the various fluid streams, as well as to provide support for the heat exchanger and to act as mounting means for said invention to said laundry dryer; and appropriate power transmission components to transmit the required rotational forces from said laundry dryer to said heat exchanger.

In the preferred embodiment, the heat exchanger transfer surface is comprised of alternating layers of flat and corrugated ribbons of material, oriented so as to provide tubular passages parallel to the axis of rotation of said heat exchanger. The structure of the heat exchanger rotor includes means by which radial as well as planar accuracy of rotation can be maintained, said means also serving as the primary structural support for said heat exchanger rotor. Sealing between said heat exchanger and its adjacent stationary structure is provided through use of contact-type seals, preferably of a resilient material, as the rotor's periphery, as well as the interface between the counterflowing airstreams. The resultant ability to provide a flat and concentric heat exchanger rotor coupled with effective contact seals eliminates airflow bypassing said rotor, in addition to minimizing cross-contamination between said airstreams.

Since the function of the apparatus described herein is to maximize fuel efficiency, it is readily concluded that such efficiency must not be gained at the expense of substantial increases in other power requirements of the dryer. Most commonly available laundry dryers utilize a single electric motor to provide both tumbler rotation and airflow. A heat exchanger whose configuration provides sufficient heat transfer surface for meaningful heat recovery must offer either (a) extended transfer surface in the direction of airflow or (b) increased exchanger face area. Since extended transfer surface in the direction of airflow also increases air pressure drop, a corresponding increase in fan horsepower requirements is necessary to deliver the required airflow through such a "thick" heat exchanger. The solution, then, is provided by increasing exchanger face area and removing said exchanger from the confines of the dryer's existing cabinetry, thus minimizing additional horsepower requirements for the fan/tumbler motor. Additional benefits are gained from the new cabinet housing said heat exchanger: Lint accumulation, a byproduct of laundry drying, and its subsequent reduction in operation efficiency of the entire dryer system are minimized; the heat exchanger now incorporates distinct airflow plenums which also serve as attaching means of the exchanger module to the laundry dryer; and most importantly, the heat recovery module through its self-supporting configuration permits attachment to existing dryers of many different designs without substantial alteration to either the dryers themselves or their installation locations.

These and other objects, features and advantages of the invention will become more readily apparent from the following detailed description of the preferred embodiment thereof, when studied together with the accompanying drawings, in which:

FIG. 1 is a perspective view of a clothes dryer, shown with the invention attached in accordance with the preferred embodiment. Seal barriers 76 and seals 34 and 38, shown in detail in subsequent figures, have been removed for purposes of clarity. Portions of the invention are shown in cutaway to disclose attachment of the invention to the dryer housing as well as to disclose arrangement of the invention's internal components. That face of the invention which lies most nearly adjacent to rear wall 13 of the dryer 11 shall hereafter be referred to as the "front".

DETAILED DESCRIPTION OF THE PREFERRED EMBODIMENT

Figure 3:
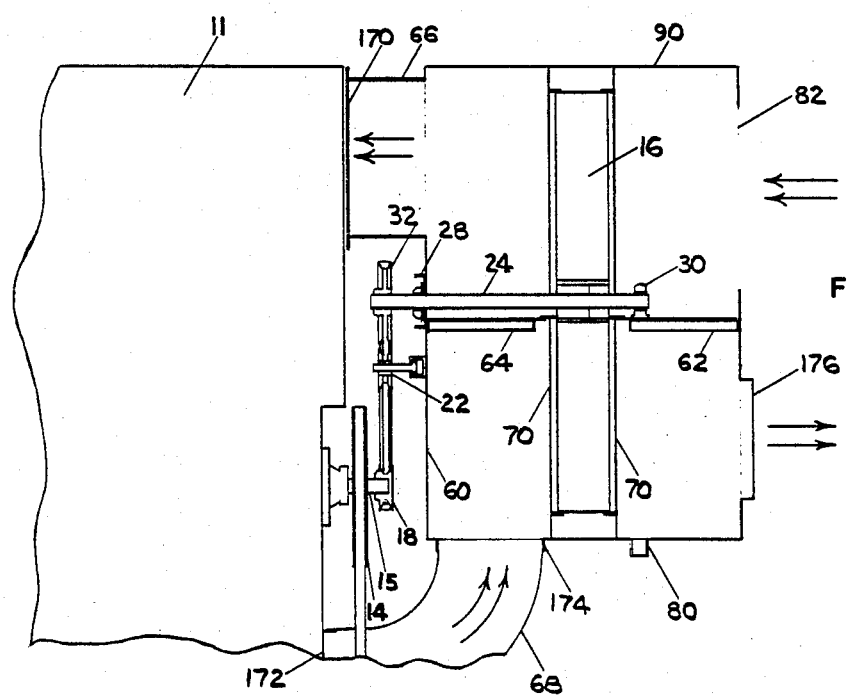
FIG. 3 is a side elevational view of the invention taken along line A—A of FIG. 1, showing in detail internal components of invention 10 in their assembled environment relative to the rotary heat exchanger, as well as those components utilized to accomplish rotation of heat exchanger 16.
Figure 4:
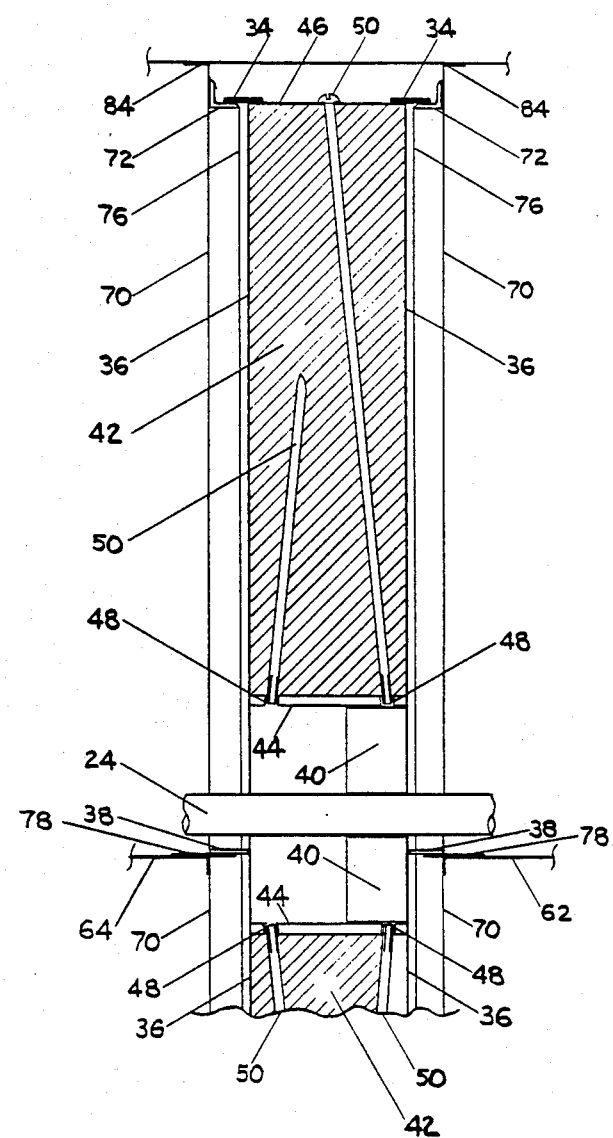
FIG. 4 is an enlarged fragmentary view of FIG. 3, wherein means for planar and radial adjustment of the heat exchanger are disclosed.

The invention 10 is basically comprised of enclosure 90; transitional pieces 66 and 68; heat exchanger 16 and its various power transmission components; mounting supports 12; internal airstream divider assemblies 62 and 64, one of which also serves as a bearing support; and peripheral seal barriers 70, to be discussed in conjunction with FIGS. 3 and 4. As in earlier discussions, the "front" of the invention 10 shall be taken as that face adjacent to rear face 13 of dryer 11.

Figure 1:
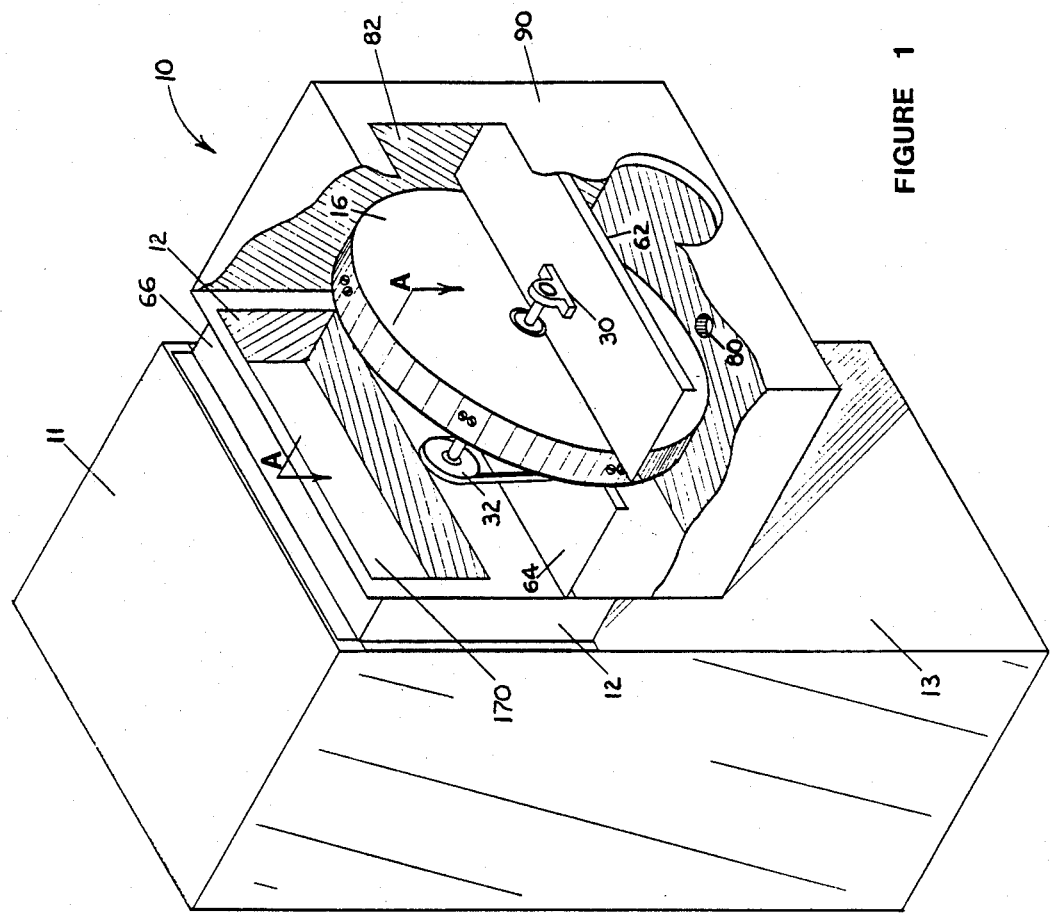
Figure 2:
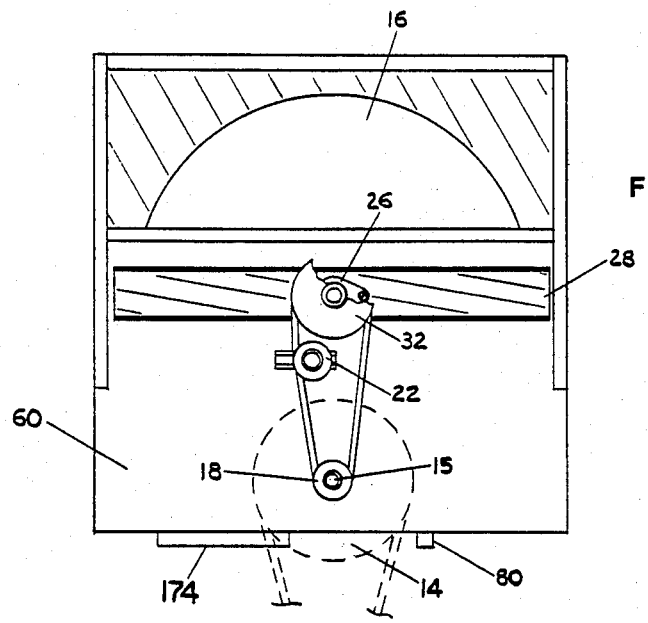
FIG. 2 is an elevational view of the invention as seen from the front, when removed from the dryer.

FIG. 1 shows the invention 10, in its preferred embodiment, attached to laundry dryer 11 by means of mounting supports 12. FIG. 2 discloses pertinent drive components of both laundry dryer 11 and the invention 10 which are utilized to accomplish rotation of the invention's rotary heat exchanger 16. FIGS. 1 and 2 shall be referenced together when required for the purpose of clarity. Thereafter each figure shall be referenced at random.

Mounting supports 12 may be modified from the typical supports shown to facilitate attachment to various types of dryers.

FIG. 2 shows tumbler pulley 14 in phantom, used to transmit rotational forces from the dryer motor to the tumbler drum itself. Pulley 14 is fastened to tumbler shaft 15, wtih the tumbler drum cantilevered off the opposite end of tumbler shaft 15. A trunnion bearing assembly is typically provided to support said tumbler shaft. In the invention's preferred embodiment, an additional driver 18, typically a v-belt pulley, is attached to tumbler shaft 15 adjacent to and to the rear of tumbler pulley 14. Power is then transmitted to heat exchanger 16, typically through a v-belt. Drive idler 22, attached to front panel 60 of the invention, serves as a drive tensioner, necessary since center distances between tumbler drum shaft 15 and heat exchanger shaft 24 remain fixed. Heat exchanger shaft 24 is supported by two anti-friction bearings. Front bearing 26, preferably of the flange-mounted type, is affixed to bearing support 28 of FIG. 2, said support being mounted against front panel 60 of the invention. Rear bearing 30 shown in FIG. 3, preferably of the pillow-block type, is affixed to rear airstream divider 62, which now functions as airstream divider, bearing support, and airstream divider seal support. Heat exchanger pulley 32, shown in FIGS. 1 and 2, is mounted at the front of heat exchanger shaft 24, and is located at assembly so as to preserve planar alignment with drive pulley 18 and drive idler 22. Front airstream divider 64 is mounted within enclosure 90, forming distinct airflow plenums, as well as providing airstream divider seal support in a manner similar to rear airstream divider 62.

FIGS. 3 and 4 reveal the components required to provide effective sealing against airflow leakage around and past heat exchanger 16. Front and rear peripheral seal barriers 70 are constructed of a rigid material, preferably sheet metal, sized in height and width dimensions to provide an airtight fit within the cross-section of enclosure 90. The outer edges of barriers 70 are provided with external flanges 84 to permit attachment of said barriers to said enclosure. Internal flanges 72 of barriers 70 are formed so as to offer rigidity to barriers 70, as well as to provide a true and concentric surface for attachment of peripheral seals 34. Said seals are fabricated from strips of resilient material, preferably of felt-like material able to withstand exposure to heat and humidity of clothes drying processes without deterioration. Peripheral seals 34 are affixed to flanges 72 such that they protrude outward from edges 76 of said flanges, towards the surface of heat exchanger 16. Seal barriers 70, with seals affixed, are then mounted within enclosure 90 in sufficient proximity to surfaces 36 of heat exchanger 16 to allow overlap of seals 34 with the rotating peripheral surface of heat exchanger 16. Airstream divider seals 38, of a somewhat more rigid but similar material to peripheral seals 34, are affixed to flat seal plates 78. Said plates are mounted to front and rear airstream dividers 64 and 62 in a manner which permits adjustment of the gap between faces 36 of heat exchanger 16 and airstream divider seals 38. Since seals 38 must necessarily be noncontact type seals to prevent deformation of airflow passages at the faces 36 of heat exchanger 16, provision for adjustment of said gap is mandatory. Capability for planar adjustment of faces 36 of heat exchanger 16 is also mandatory, as explained below.

In FIG. 4, heat exchanger construction and adjacent components are shown in detail. Following wrapping of alternating flat and corrugated ribbons of heat exchange media 42 about inner hub 44, heat exchange media 42 is constricted slightly, and an outer band 46 is slipped over the outer layer of media 42. To maintain reasonable concentricity, outer band 46 is fabricated from material whose cross-section is reasonably concentric before the band is produced, such as commonly available large-diameter metal tubing. After this "slice" of tubing, now outer band 46, is slipped over heat exchange media 42, holes, spaced typically at 60° intervals radially, are bored through outer band 46, media 42, and inner hub 44, with internal threads 48 formed at the hub end of each hole. Said holes are bored in pairs, each hole of said pair being alternately skewed with respect to faces 36 of heat exchanger 16. Finally, fasteners 50 of the appropriate type are inserted through said bored holes and threaded into threads 48 in inner hub 44. When completely assembled, the structure will permit planar as well as radial adjustment of heat exchanger 16, while providing ridigity through the same structural members, in essentially the same manner as a spoked bicycle or motorcycle wheel. Heat exchanger 16 is affixed to heat exchanger shaft 24 utilizing bushing 40, typically a bushing of the type used with v-belt pulleys.

Other than attachment of invention 10 to dryer 11 and interface of power transmission components as previously described, the only remaining components of the invention relate to ductwork attachment. A laundry dryer such as that shown in FIGS. 1 and 3 typically is offered with air intake 170, subsequently exhausting the heated air through outlet 172, which is then vented to atmosphere. Insertion of the invention into the airflow system is accomplished by providing exhaust transitional piece 68 for connection between dryer exhaust outlet 172 and the invention's exhaust inlet 174, as shown in FIG. 3. Exhaust outlet 176 of the invention is then attached to previously existing exhaust ductwork for the laundry dryer. In the same manner, supply transitional piece 66 is provided for connection between fresh air inlet 170 of dryer 11 and the supply outlet of the invention. Opening 182 in enclosure 90 now serves as the new fresh air inlet. Transitional pieces such as those described herein permit installation of the invention on dryers of various configurations, as well as providing access to both dryer and heat recovery module for service, removal of possible lint accumulation, lubrication, and the like.

Returning to FIG. 3, drain connection 80 is shown at the bottom of enclosure 90. Under normal operation, the moisture-laden exhaust air exiting from dryer exhaust outlet 176 will condense moisture as its temperature drops upon passing through heat exchanger 16. Drainage of said condensed moisture is accomplished through connection 80, with the condensate to be reused or discharged.

Having fully described the invention in accordance with the preferred embodiment, it is anticipated that various changes and modifications will be undertaken by those skilled in the art without departing from the spirit and scope of the invention described herein.

What is claimed is:

1. Energy recirculating apparatus adapted for coupling to a clothes dryer comprising:
    a housing having a plurality of chambers, a first chamber arranged to receive input air and a second chamber arranged for exhausting output air;
    a rotor having a hub, a rim and spaced first and second substantially parallel surfaces joining said hub and rim;
    said rotor being interposed between said first and second chambered regions for transferring energy from said exhaust air to said input air;
    a plurality of rods radially disposed within said rotor and arranged such that alternate ones of said rods have first ends disposed about said rim substantially equidistant from said first and second surfaces, and second ends disposed about said hub, offset towards said first surface of said rotor, others of said rods being arranged with first ends disposed about said rim substantially equidistant from said first and second surfaces and second ends disposed about said hub, offset towards said second surface of said rotor;
    means for rotating said rotor;
    annular means coupled to said housing and disposed in close proximity to said rim of said rotor for creating a uniform close space between said housing and said rotor;
    resilient means interposed between said annular means and said rotor for preventing air from passing in the space beteween said housing and said rotor.

2. Apparatus according to claim 1 wherein said rods include a threaded end adaptably arranged for coupling to said hub and a flanged end.

3. Apparatus according to claim 1 further comprising a non-annular flange having length, at least, equal to the diameter of said rotor and disposed within said housing in close proximate relationship to said first surface and said hub of said rotor;
    further resilient means coupled to said non-annular flange and disposed in close proximate relationship with said first surface for preventing air from passing between said first and second chamber of said housing.

4. Apparatus according to claim 1 wherein said housing further comprises an orifice in said first chamber for receiving input air, an orifice in said second chamber for exhausting air and means for coupling said housing to said clothes dryer.

5. Apparatus according to claim 1 and claim 3 wherein said rotor further inludes corrugated energy storing material spaced substantially concentric with said hub of said rotor, and located within the space between the first and second parallel surfaces.

6. Apparatus according to claim 5 wherein said corrugated energy storing material is arranged in a plurality of substantially concentric layers about said hub; and
    a plurality of non-corrugated energy storing material interposed between alternate concentric layers of said corrugated material.

7. Apparatus according to claim 1 wherein said means for rotating said rotor includes a shaft coupled to said rotor and means coupled to said shaft for receiving drive forces from said dryer to rotate said rotor.

* * * * *